US012092750B2

(12) United States Patent
Fakoorian et al.

(10) Patent No.: US 12,092,750 B2
(45) Date of Patent: Sep. 17, 2024

(54) DETERMINING A POSITION OF A TARGET UE USING ASSISTING UE SIGNALING

(71) Applicant: APPLE INC., Cupertino, CA (US)

(72) Inventors: Seyed Ali Akbar Fakoorian, Cupertino, CA (US); Chunhai Yao, Beijing (CN); Chunxuan Ye, San Diego, CA (US); Dawei Zhang, Cupertino, CA (US); Haitong Sun, Cupertino, CA (US); Hong He, Cupertino, CA (US); Jie Cui, Cupertino, CA (US); Oghenekome Oteri, San Diego, CA (US); Sigen Ye, Cupertino, CA (US); Wei Zeng, Cupertino, CA (US); Weidong Yang, San Diego, CA (US); Yang Tang, Cupertino, CA (US); Yushu Zhang, Beijing (CN); Zhibin Wu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 356 days.

(21) Appl. No.: 17/593,649

(22) PCT Filed: Oct. 9, 2020

(86) PCT No.: PCT/CN2020/120009
§ 371 (c)(1),
(2) Date: Sep. 22, 2021

(87) PCT Pub. No.: WO2022/073201
PCT Pub. Date: Apr. 14, 2022

(65) Prior Publication Data
US 2022/0308153 A1 Sep. 29, 2022

(51) Int. Cl.
*H04W 64/00* (2009.01)
*G01S 5/00* (2006.01)
(Continued)

(52) U.S. Cl.
CPC .......... *G01S 5/0072* (2013.01); *H04L 5/0051* (2013.01); *H04W 24/10* (2013.01); *H04W 64/00* (2013.01)

(58) Field of Classification Search
CPC .......... H04W 4/40; H04W 72/25; H04W 4/46; H04W 64/00; H04W 4/02; H04W 72/232
See application file for complete search history.

(56) References Cited

U.S. PATENT DOCUMENTS

| 2016/0095080 A1 | 3/2016 | Khoryaev et al. |
| 2017/0212206 A1 | 7/2017 | Kim et al. |

(Continued)

FOREIGN PATENT DOCUMENTS

| CN | 102355726 A | 2/2012 |
| WO | 2012021097 A2 | 2/2012 |
| WO | 2019027245 A1 | 2/2019 |

OTHER PUBLICATIONS

WIPO, International Search Report and Written Opinion, PCT/CN2020/120009, Jul. 15, 2021, 9 pages.

*Primary Examiner* — Tu X Nguyen
(74) *Attorney, Agent, or Firm* — Dorsey & Whitney LLP

(57) ABSTRACT

Systems and methods for measuring at and reporting by a target user equipment (UE) of one or more positioning signals sent from one or more assisting UEs to the target UE are disclosed herein. The target UE may receive a positioning signal from an assisting UE according to a communication received at the target UE. The target UE may proceed to perform a positioning measurement using the positioning signal received from the target UE. The positioning measurement may be used by the target UE to estimate its own position, or the positioning measurement may be sent to another entity within a wireless communications system to be used in estimating the physical position of the UE. The handling of multiple received positioning signals from vari- (Continued)

ous sources, and the handling of situations where, for example, a transmission reception point (TRP) and an assisting UE may schedule overlapping positioning signals, ate also discussed.

20 Claims, 14 Drawing Sheets

(51) Int. Cl.
*H04L 5/00* (2006.01)
*H04W 24/10* (2009.01)

(56) References Cited

U.S. PATENT DOCUMENTS

| | | |
|---|---|---|
| 2019/0239181 A1 | 8/2019 | Gangakhedkar et al. |
| 2019/0297673 A1 | 9/2019 | Xue et al. |
| 2021/0058889 A1* | 2/2021 | Zhang ................... G01S 5/10 |
| 2022/0279581 A1* | 9/2022 | Baek .................... G01S 13/765 |
| 2023/0296752 A1* | 9/2023 | Thomas ............... G01S 13/765 |
| | | 342/125 |

* cited by examiner

DETERMINING A POSITION OF A TARGET UE USING ASSISTING UE SIGNALING

TECHNICAL FIELD

This application relates generally to wireless communication systems, including the measurement and/or reporting, by a target user equipment (UE), of positioning signals transmitted from assisting UEs of said wireless communication systems to the target UE.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs. RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data, rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Accurate data regarding a physical position of a UE may be of use at one or more entities of a wireless communications system in which the UE operates (e.g., a UE, a base station, etc.). For example, it may be helpful to know a physical position of a UE with high accuracy so that tracking, handover, and other functions of the wireless communications network that directly relate to the physical operation of the UE within the wireless communications system are improved (correspondingly to the high accuracy). As another example, user applications that operate on or within the wireless communications system (e.g., applications that operate at least in part on one or more of the UE, the base station, or another entity of the wireless communications system) and which may further communicate with other entities within the wireless communication system relative to such location information may also benefit from access to information regarding the physical positioning of a UE with high accuracy. It has also been noted that the process of determining a location of the UE within a wireless communications system involves the use of system resources (e.g., it may involve the use of signaling resources between the UE and the base station, and/or processing resources at one or more of the UE, the base station, and/or another entity of the wireless communications system, etc.). Accordingly, to the extent that the speed at which signaling and/or processing related to UE positioning occurs can be improved (e.g., made faster), applications using such data can be improved (e.g., through their faster access to UE location data making it possible for them to improve the speed of completion of their UE positioning related processes) Further, to the extent that fewer overall resources of the wireless communications system can be used corresponding to the signaling and/or processing used to determine an accurate location of the UE, efficiency (e.g., power use) at the UE, the base station, and/or another entity of the wireless communications system can be improved (e.g., less power overall can be used). Accordingly, it has been recognized that procedures for (any of) improved accuracy, reduced latency, network efficiency, device efficiency, and improved integrity relative to the determination of a location of a UE would be of value to operators and users of such wireless communications systems.

Figure 1:
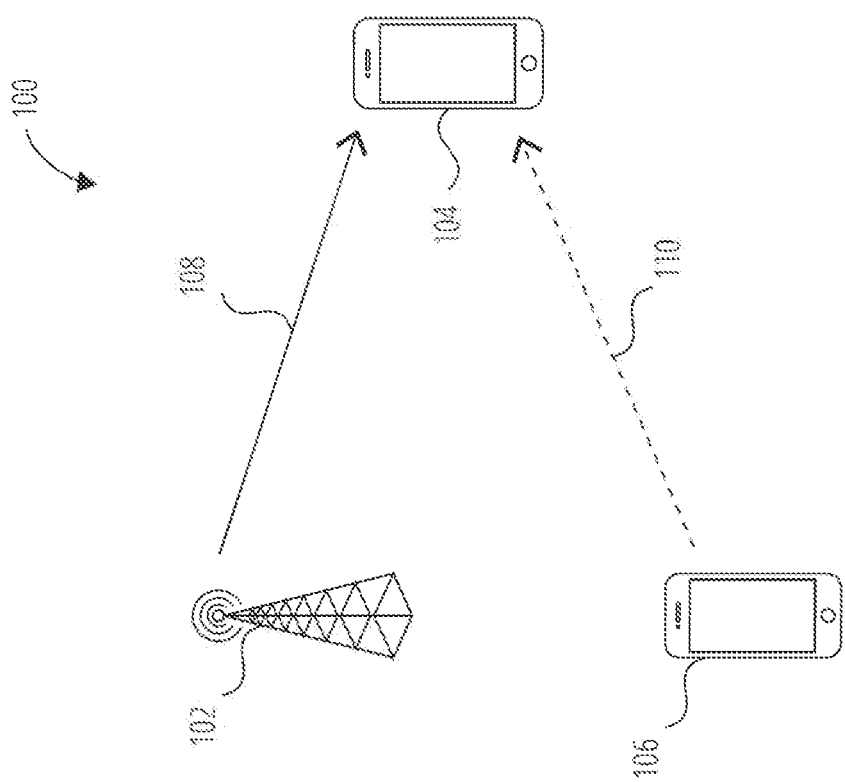
FIG. 1 illustrates a wireless communications system, according to an embodiment.

FIG. 1 illustrates a wireless communications system 100 according to an embodiment. The wireless communications system 100 includes a transmission reception point (TRP) 102, a target UE 104, and an assisting UE 106. In the embodiment of FIG. 1, the TRP 102 is configured to send a TRP positioning signal 108 to the target UE 104, and the assisting UE 106 is configured to send an assisting UE positioning signal 110 to the target UE 104.

In some embodiments, the TRP 102 provides downlink (DL) signaling from a core network of the wireless communications system 100 to one or more UEs (e.g., the target UE 104 and/or the assisting UE 106) of the wireless communications system 100, The TRY may additionally (or alternatively) receive uplink (UL) signaling from one or more UEs (e.g., the target UE 104 and/or the assisting UE 106) to the core network of the wireless communications system 100. It is contemplated that in some embodiments, a base station (e.g., a gNB, an eNB, or another type of base station) of the wireless communications system 100 may be the TRP 102. In other embodiments, the base station may instead be a separate entity within the wireless communications system 100 from the TRP 102, with the TRP 102 handling functionalities within the wireless communications system 100 directly related to signaling to and/or from one or more UEs as directed by the base station. It is contemplated that embodiments discussed herein may be applied in either of these cases.

The target UE 104 may be configured to receive and measure one or more signals from another entity within the wireless communications system 100 for positioning purposes. Such signals may be called "positioning signals" herein, while the corresponding measurements taken at the target UE 104 may be called "positioning measurements." Possible positioning measurements that the target UE 104 may make on such received positioning signals include a time of arrival of the received positioning signal, a signal strength/quality of the received positioning signal (e.g., an RSRP of the positioning signal), and/or an angle of arrival of the received positioning signal. The UE may then either 1) itself use this data to calculate its physical position and/or 2) communicate this data to another entity within the wireless communications system 100 such that the location of the UE may be calculated using such data. Examples of possible positioning methods using such positioning measurements may be found in in 3GPP Technical Specification (TS) 38.305 (version 16.1, July 2020). The wireless communications system 100 may schedule directly (e.g., via a base station of the wireless communications system 100 that is or is in communication with the TRP 102) the transmission of the TRP positioning signal 108 to the target UE 104 for measurement purposes.

It has been recognized that the determination of the position of the target UE 104 could be made more accurate (or in some cases, newly be made possible) by receiving additional positioning signal(s) at the target UE 104 beyond just the TRP positioning signal 108. For example, the receipt (and subsequent measurement) of additional positioning signals by the target UE 104 may ultimately lead to a more accurate determination of the position of the target UE 104 over methods where fewer positioning signals are measured at the target UE 104. The receipt and subsequent measurement of additional positioning signals over prior methods may be particularly useful in cases where one or more of the positioning signals received at the target UE 104 for use for one or more positioning measurements is not optimal (e.g., it has a low RSRP, or there is no line of sight from the target UE 104 to the transmitter of the positioning signal). The additional positioning signals may therefore help the wireless communications system 100 overcome any errors and/or inaccuracies that may otherwise be driven by the suboptimal circumstances.

Accordingly, it has been recognized that entities other than, for example, the TRP 102 (which may itself be a base station of the wireless communications system 100) may be used to source one or more of these additional positioning signals to the target UE 104. In some embodiments, the target UE 104 may receive, for example, an assisting UE positioning signal 110 from the assisting UE 106 (in addition to, or alternatively to, any TRP positioning signal 108 from the TRP 102). Either of these positioning signals may be a signal for which a measurement may be taken by the target UE 104 in order to provide data for a positioning method, as described above (and perhaps as adjusted to account for the fact that the assisting UE positioning signal 110 was sent from the assisting UE 106 and not from, e.g., the TRP 102). While FIG. 1 illustrates a single assisting UE 106 sending a single assisting UE positioning signal 110 for simplicity, it is contemplated that any number of assisting UEs may each send any number of assisting positioning signals to a target UE 104 for measurement at the target UE 104, such that the measurements may be used to determine the position of the target UE 104 in the manner described.

It may be that the assisting UE positioning signal 110 sent from the assisting UE 106 is of a positioning signal type that is already otherwise being used in the wireless communications system 100 for other purposes. For example, the assisting UE positioning signal 110 may in some cases be a DL positioning reference signal (DL-PRS), a sounding reference signal for positioning (Pos-SRS), another type of sounding reference signal (SRS), or some other signal that may also be being used in the wireless communications system 100 for, for example, one or more communications between the target UE 104 and the TRP 102. It is also contemplated that a new type of positioning signal may be developed for use as the assisting UE positioning signal 110. This new type of positioning signal may be, for example, a symbol for use in flexible symbols.

In some embodiments, the target UE 104 receives a communication indicating that the target UE 104 is to receive a positioning signal from the assisting UE 106. This communication may be in the form of a dynamic indication and/or a static configuration setting. For example, a base station (e.g., that is acting as the TRP 102, or alternatively that is acting through the TRP 102) may dynamically indicate to the target UE 104 is to expect (e.g., prepare to receive and measure) the assisting UE positioning signal 110 from the assisting UE 106. This may be useful in cases where the base station is aware of and/or in control of the assisting UE 106 and wants to relatively immediately achieve the additional accuracy that is possible through the use of positioning signals sent by the assisting UE 106 to the target UE 104. It is also contemplated that a dynamic indication to expect the assisting UE positioning signal 110 may arrive instead from the assisting UE 106. Such a dynamic indication to the target UE 104 may arrive at the target UE 104 from the TRP 102 through downlink control information (DCI), from the assisting UE 106 as sidelink control information (SCI), or through the use of data in a medium access control (MAC) control element (MAC-CE).

In other embodiments, the communication indicating that the target UE 104 is to receive a positioning signal from the assisting UE 106 may arrive in the form of a static configuration parameter. This configuration parameter may be implemented such that, for example, the target UE 104 will properly receive and measure the assisting UE positioning signal 110 from the assisting UE 106 once the target UE 104 later comes into range of and/or later receives the assisting UE positioning signal 110. This may be useful in cases where the target UE 104 may leave the range of the TRP 102, but where it is still desirable for the target UE 104 to be able to receive positioning signals from the assisting UE 106 in the future. For example, it may be that an emergency responder using the target UE 104 enters a building where the target UE 104 is out of range of the TRP 102 but still within range of the assisting UE 106. In these cases, a target UE 104 that has already been configured (e.g., by the TRP 102) to receive the assisting UE positioning signal 110 from the assisting UE 106 would still be able to use such assisting UE positioning signal 110 received from the assisting UE 106 to take a measurement (e.g., for use of a positioning calculation at the target UE 104 or for communication back to the assisting UE 106 (which may then forward such data to another entity of the wireless communications system 100, such as the base station), etc.). It is also contemplated that the static configuration parameter may be sent to the target UE 104 from the assisting UE 106 in some cases. Such a static configuration parameter may be sent to the target UE 104 from the TRP 102 as DCI, from the assisting UE 106 as SCI, or through the use of data in a MAC-CE.

The dynamic indication to and/or static configuration of the target UE 104 to use the assisting UE positioning signal 110 from the assisting UE 106 for positioning measurements may depend on UE capability. This capability may have been previously transmitted by the target UE 104 in a UE capability information message prior to receiving the assisting UE positioning signal 110 from the assisting UE 106. This UE capability information message may be transmitted to either of the TRP 102 and/or the assisting UE 106. This UE capability information message may indicate whether the target UE 104 is capable of measuring an assisting UE positioning signal 110 from the assisting UE 106 for positioning purposes.

The assisting UE 106 may be configured to send to the target UE 104, and/or the target UE 104 may be configured to receive from the assisting UE 106, one or more positioning signals in a periodic manner, a semi-persistent manner, or an aperiodic manner. For example, a base station may send the assisting UE 106 a radio resource control (RRC) configuration that instructs the assisting UE 106 to send one or more positioning signals to the target UE 104 in a periodic, semi-persistent, or aperiodic manner. Further, a base station may send the target UE 104 an RRC configuration that instructs the target UE 104 to receive one or more positioning signals from the assisting UE 106 in a periodic, semi-persistent, or aperiodic manner. Alternatively, the target UE 104 may be preconfigured to receive one or more positioning signals from the assisting UE 106 in a periodic, semi-persistent, or aperiodic manner. In these cases, the assisting UE 106 may be instructed by a base station to send the one or more positioning signals in the one of the periodic, semi-persistent, or aperiodic manner that matches this preconfiguration of the target UE 104. Examples of possible periodic signal types that may be configured to be sent in a periodic, semi-persistent, or aperiodic manner include (but are not limited to) DL-PRS signals, Pos-SRS signals, and other SRS signals (among other possibilities).

In the case of positioning signals that are configured to be sent to the target UE 104 by the assisting UE 106 in a semi-persistent or periodic manner, the sending of such positioning signals by the assisting UE 106 and/or the receiving of such positioning signals by the target UE 104 may be triggered or activated by downlink control information (DCI) from a base station to either device. In some cases, the receiving of such positioning signals by the target UE 104 from the assisting UE 106 may be triggered or activated by sidelink control information (SCI) from the assisting UE 106 to the target UE 104. Further, in some cases, the sending of such positioning signals by the assisting UE 106 to the target UE 104 may be triggered or activated by SCI from the target UE 104 to the assisting UE 106.

The dynamic indication to and/or static configuration of the target UE 104 to receive an assisting UE positioning signal 110 from the assisting UE 106 may indicate one or more symbol directions upon which the positioning signal may be sent from the assisting UE 106 to the target UE 104. For example, the communication may indicate that the assisting UE positioning signal 110 is to be received from the assisting UE 106 on symbols specified for use in a DL direction (also discussed herein as "DL symbols"), an UL direction (also discussed herein as "UL symbols"), or in a flexible (either UL or DL) direction (also discussed herein as "flexible symbols") (or any combination of these). This information may arrive at the target UE 104 from the TRP 102 in DCI, from the assisting UE 106 as SCI, or through the use of data in a MAC-CE. In some embodiments, the communication of the one or more symbol directions upon which the assisting UE positioning signal 110 is kept consistent with a UE capability information message that previously indicated symbol directions (UL, DL, flexible) upon which the target UE 104 can receive the assisting UE positioning signal 110 from the assisting UE 106.

An assisting UE positioning signal 110 sent by the assisting UE 106 may be of a type and/or waveform that corresponds to a direction of the symbols upon which the assisting UE positioning signal 110 is sent (e.g., a direction of the symbols that has been communicated to the target UE 104, as described above). For example, if the assisting UE positioning signal 110 is sent on DL symbols, it may be that the assisting UE positioning signal 110 is sent as a DL-PRS in a cyclic prefix orthogonal frequency division multiplexing (CP-OFDM) waveform, or as some other positioning signal (in its corresponding waveform, such as a discrete Fourier transform spread orthogonal frequency division multiplexing (DFT-S-OFDM) waveform or any other appropriate waveform) that is traditionally associated with/sent in the DL direction between the target UE 104 and the TRP 102. In other cases, if the assisting UE positioning signal 110 is sent on UL symbols, it may be that the assisting UE positioning signal 110 is sent as a Pos-SRS in a Zadoff-Chu sequence, or as some other positioning signal (in its corresponding waveform) that is traditionally associated with/sent in an UL direction between the target UE 104 and the TRP 102. As another example, if the assisting UE positioning signal 110 is sent on flexible symbols, it may be that the assisting UE positioning signal 110 is a new positioning symbol (in a corresponding waveform) that is capable of being sent in a flexible direction.

It is also contemplated that a combination of two or more positioning signals otherwise used in the wireless communications system 100 may be sent as the assisting UE positioning signal 110. In some embodiments, the choice of positioning signal used as assisting UE positioning signal 110 is consistent with a UE capability information message that previously indicated signal types(s) that the target UE 104 can measure for positioning purposes when sent from the assisting UE 106.

Further, in cases involving the reception of a plurality of assisting UE positioning signals from one or more assisting UEs (e.g., within a relatively short span of time, though not necessarily overlapped), the TRP 102, the assisting UE 106, or another element of the wireless communications system 100 may send a communication to the target UE 104 that dynamically indicates and/or statically configures the target UE 104 to take and report measurements from a subset the positioning signals from the set of such received positioning signals. This communication may be made as part of or in addition to communications to the target UE 104 as described above. The subset of positioning signals so measured and reported may be referred to herein as a "reporting subset" of the set of received positioning signals.

This communication may include a reference signal received power (RSRP) or other threshold, such that the reporting subset is the subset of positioning signals received with an RSRP at and/or above the threshold. Alternatively, this communication may include a limit on the number of positioning signals that are to be reported, such that the reporting subset is the subset of the best signals (e.g., as measured by RSRP) up to that number.

This communication may include source prioritization information for the reporting subset. For example, the communication may instruct the target UE 104 that the it should prioritize reporting of a positioning signal from the TRP 102 over a positioning signal from the one or more assisting UEs (such as the assisting UE 106). As another example of source prioritization information, the communication may instruct the target UE 104 that it should prioritize the measurement and/or reporting of an assisting UE with a lower mobility over another assisting UE with a higher mobility. The communication may further instruct the target UE 104 to make these determinations as between received positioning signals with similar signal qualities (e.g., to make these determinations after first pruning out positioning signals with weaker RSRPs from the set of all received positioning signals). It is also contemplated that source prioritization information may instruct in using multiple of and/or combinations of these or other methods.

In some embodiments, the prioritization information used to make the selection of positioning signals for the target UE to use to determine its location or to report measurements thereof to another entity may be specified in a standard. For example, a standard may specify that positioning signals from TRP take precedence over positioning signals from an assisting UE; or that the positioning signals are to be prioritized according to signal strength, with a signal at a higher signal strength over a signal of a lower signal strength. It is also contemplated that a standard may define prioritization information to reflect multiple of (and/or a combination of) these or other methods.

In some embodiments, the assisting UE 106 receives a communication indicating that the assisting UE 106 is to transmit a positioning signal to the target UE 104. This communication may be in the form of a dynamic indication and/or a static configuration setting. For example, a base station (e.g., that is acting as the TRP 102, or alternatively that is acting through the TRP 102) may dynamically indicate to the assisting UE 106 that it is to transmit the assisting UE positioning signal 110 to the target UE 104. This may be useful in cases where the base station is aware of and/or in control of the assisting UE 106 and wants to relatively immediately achieve the additional accuracy that is possible through the use of positioning signals sent by the assisting UE 106 to the target UE 104. It is also contemplated that a dynamic indication to transmit the assisting UE positioning signal 110 may arrive instead from the target UE 104. Such a dynamic indication to the assisting UE 106 may arrive at the assisting UE 106 from the TRP 102 through DCI, from the target UE 104 in SCI, or through the use of data in a MAC-CE. The assisting UE 106 may accordingly schedule the transmission of one (or more assisting UE positioning signals, including the assisting UE positioning signal 110.

In other embodiments, the communication indicating that the assisting UE 106 is to transmit a positioning signal to the target UE 104 may arrive in the form of a static configuration parameter. This configuration parameter may be implemented such that, for example, the assisting UE 106 will transmit the assisting UE positioning signal 110 to the target UE 104 at a later time. This may be useful in cases where the assisting LIE 106 may leave the range of the TRP 102, but where it is still desirable for the target UE 104 to be able to receive positioning signals from the assisting UE 106 in the future. In these cases, an assisting UE 106 that has already been configured (e.g., by the TRP 102) to transmit the assisting UE positioning signal 110 to the target UE 104 would still be able to aid a positioning calculation at the target UE 104. It is also contemplated that a static configuration parameter may be sent to the assisting UE 106 from the target UE 104 in some cases. Such a static configuration parameter may be sent to the assisting UE 106 from the TRP 102 as DCI, from the target UE 104 in SCI, or through the use of data in a MAC-CE.

The dynamic indication to and/or static configuration of the assisting UE 106 to send the assisting UE positioning signal 110 to the target UE 104 for positioning measurements may depend on UE capability. This capability may have been previously transmitted by the assisting UE 106 in a UE capability information message prior to transmitting the assisting UE positioning signal 110 from the to the target UE 104. This UE capability information message may be transmitted to either of the TRP 102 and/or the target UE 104. This UE capability information message may indicate whether the assisting UE 106 is capable of transmitting an assisting UE positioning signal 110 to the target UE 104 for positioning purposes.

The communication that the assisting UE 106 is to transmit an assisting UE positioning signal 110 to the target UE 104 may further indicate one or more symbol directions upon which the positioning signal may be sent from the assisting UE 106 to the target UE 104. For example, the communication may indicate that the assisting UE positioning signal 110 is to be transmitted by the assisting UE 106 on DL symbols. UL symbols, and/or flexible symbols (or any combination of these). This information may arrive at the assisting UE 106 from the TRP 102 in DCI, from the target UE 104 in SCI, or through the use of data in a MAC-CE. In some embodiments, the communication of the one or more symbol directions upon which the assisting UE positioning signal 110 is kept consistent with a UE capability information message that previously indicated symbol directions (UL, DL, flexible) upon which the assisting UE 106 can transmit the assisting UE positioning signal 110 to the target UE 104.

As described above, it may be that the assisting UE positioning signal 110 transmitted by the assisting UE 106 is of a positioning signal type that is already otherwise being used in the wireless communications system 100 for other purposes, or a new positioning type, and in some cases may be of a type and/or waveform that corresponds to a direction of the symbols upon which the assisting UE positioning signal 110 is sent (as also described above). It is also contemplated that a combination of two or more positioning signals otherwise used in the wireless communications system 100 may be sent as the assisting UE positioning signal 110, as described above. In some embodiments, the choice of positioning signal used as assisting UE positioning signal 110 is consistent with a UE capability information message that previously indicated signal types(s) that the target assisting UE 106 can transmit for positioning purposes when sent to the target UE 104.

The TRP 102, the target UE 104, or another element of the wireless communications system 100 may send a communication (either as part of, or in separately, communications to the assisting UE 106 as described above) to the assisting UE 106 that dynamically indicates and/or statically configures the assisting UE 106 to transmit the assisting UE positioning signal 110 at a specific transmit power. This may cause the assisting UE positioning signal 110 to be transmitted with a common transmit power as other positioning signals received at the target UE 104 from other entities of the wireless communications system 100 (e.g., from the TRP 102 or another assisting UE) such that various measurements are normalized between each other upon receipt.

The TRP 102, the target UE 104, or another element of the wireless communications system may send a communication (either as part of, or separately from, communications to the assisting UE 106 as described above) to the assisting UE 106 that dynamically indicates and/or statically configures the assisting UE 106 to only transmit the assisting UE positioning signal 110 under specific criteria. For example, the communication may instruct the assisting UE 106 to only transmit the assisting UE positioning signal 110 when the velocity of the assisting UE 106 is at or less than (or alternatively, less than) a velocity threshold (or in other words, to not transmit the assisting UE positioning signal 110 when the velocity of the assisting UE 106 is greater than (or alternatively, at or greater than) the velocity threshold). This may be in recognition of the fact that the use of a positioning signal at the target UE 104 from the assisting UE 106 that was transmitted when the assisting UE 106 is moving relatively quickly may hinder rather than aid the search for an accurate positioning of the target UE 104 (at least because the assisting UE 106 may not act well as a "known" point in the wireless communications system 100 under these conditions).

Within the wireless communications system 100, it is conceivable that the TRP 102 and the assisting UE 106 may, without further intervention, respectively transmit the TRP positioning signal 108 and the assisting UE positioning signal 110 with at least some temporal overlap, such that one or more symbols is overlapped (used) during the transmission of each of the TRP positioning signal 108 and the assisting UE positioning signal 110. It may be that the target UE 104 does not expect (e.g., the wireless communications system 100 is not configured to allow for) this overlapping case (e.g., by coordinating the transmissions of the TRP positioning signal 108 and the assisting UE positioning signal 110 within the wireless communications system 100 so that this overlap situation does not occur). In these cases, when an overlap condition between two such upcoming transmissions exists, it may be that the target UE 104 expects a positioning signal from the TRP 102 rather than the assisting UE 106 (e.g., the TRP 102 is permitted to transmit the TRP positioning signal 108 and the transmission of the assisting UE positioning signal 110 is delayed or cancelled, whether fully or partially). In others of these cases, when an overlap condition between two such upcoming transmissions would otherwise occur, it may be that the target UE 104 expects a positioning signal from the assisting UE 106 rather than the TRP 102 (e.g., the assisting UE 106 is permitted to transmit the assisting UE positioning signal 110 and the transmission of the TRP positioning signal 108 is delayed or cancelled, whether fully or partially). In others of these embodiments, it may be that the target UE 104 expects the one of the TRP positioning signal 108 and the assisting UE positioning signal 110 that is of a periodicity type that is of a higher priority than the other of the TRP positioning signal 108 and the assisting UE positioning signal 110 (and the TRP 102 and/or the assisting UE 106 may delay and/or cancel (whether fully or partially) the TRP positioning signal 108 or the assisting UE positioning signal 110, as appropriate, to meet this expectation). In these cases, a positioning signal that is of an aperiodic type may have a higher priority than a positioning signal that is of a semi-periodic type (e.g., a positioning signal that is activated and/or deactivated via MAC-CE), and positioning signals of either an aperiodic type or a semi-periodic type may have a higher priority than a positioning signal that is of a periodic type (e.g., a positioning signal caused by an RRC configuration). In other words, a positioning signal that is of a periodic type may have a lower priority than either of positioning signal that is of an aperiodic type or a semi-periodic type, and a positioning signal that is of a semi-periodic type may have a lower priority than a positioning signal that is of an aperiodic type. In these cases, it is anticipated that 1) the identification of an upcoming transmission overlap condition and/or 2) the decision to delay or cancel one or more positioning signals according to these conditions may be made at either of the TRP 102 or the assisting UE 106 as appropriate with each such entity is responsible for making appropriate determinations individually. Alternatively, any such delays/cancellations may be explicitly instructed to the TRP 102 and/or the assisting UE 106 by another element of the wireless communications system 100 (such as a base station that is the TRP 102 or that is in communication with each of the TRP 102 and the assisting UE 106) which has determined that upcoming transmissions will overlap.

It is further contemplated that, in the case of multiple assisting UEs, it would otherwise be possible to have an analogous conflict situation between, for example, a first assisting UE positioning signal and a second assisting UE positioning signal sent respectively from different assisting UEs. In this case, it is contemplated that an analogous application of the priority based on respective periodicity types could again be used to determine which of the first assisting UE positioning signal and the second assisting UE positioning signal to send, and which to delay and/or cancel (whether fully or partially). It is also contemplated that prioritization based on respective periodicity types could be extended to any number of overlapping positioning symbols (from whatever source, including both TRP and assisting UE) in order to determine which of various positioning signals to send, and which to delay and/or cancel (whether fully or partially).

It may be that the target UE 104 is capable of receiving positioning signals from the TRP 102 and the assisting UE 106 simultaneously (e.g., that overlap on one or more symbols) in some circumstances. For example, the TRP 102 may transmit the TRP positioning signal 108 in a first component carrier (CC) at a time that overlaps with one or more symbols used in the transmission by the assisting UE 106 of the assisting UE positioning signal 110 in a second CC. In this case, rather than cancelling or delaying one of the TRP positioning signal 108 and the assisting UE positioning signal 110, the target UE 104 may instead be able to receive both the TRP positioning signal 108 and the assisting UE positioning signal 110, despite the overlapped one or more symbols, because the target UE 104 may have one or more transceivers capable of simultaneously receive data on different CCs. The target UE 104 in this case may then proceed to measure and/or report on each of these positioning signals, as described above.

It is further contemplated that this simultaneous reception of multiple positioning signals from unique CCs may be extended to a number up to the number of CCs that a UE is capable of receiving simultaneously (and from whatever source, whether TRP and/or assisting UE).

Figure 2:
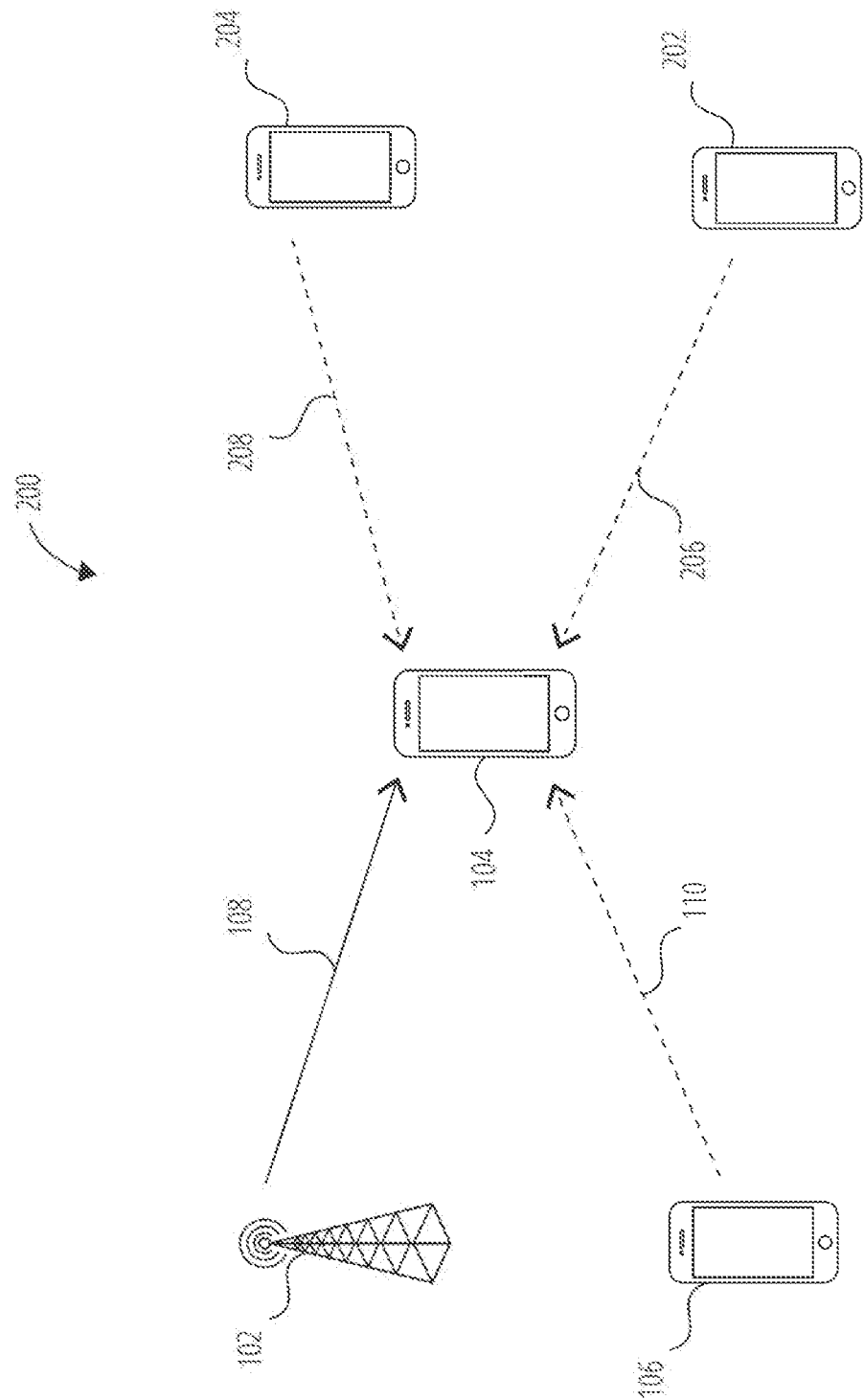
FIG. 2 illustrates a wireless communications system, according to an embodiment.

In some embodiments, as noted above, it may be that a target UE is, for example, dynamically indicated to and/or statically configured to receive a plurality of assisting UE positioning signals from one or more assisting UEs. FIG. 2 illustrates a wireless communications system 200 according to an embodiment. The wireless communications system 200 includes the TRP 102, the target UE 104, the assisting UE 106, a second assisting UE 202, and a third assisting UE 204. In the embodiment of FIG. 2, the TRP 102 is configured to send the TRP positioning signal 108 to the target UE 104 and the assisting UE 106 is configured to send the assisting UE positioning signal 110 to the target UE 104, in the manner described above. Further, the second assisting UE 202 is configured to send a second assisting UE positioning signal 206 to the target UE 104, and the third assisting UE 204 is configured to send a third assisting UE positioning signal 208 to the target UE 104. Accordingly, the features and functionalities described above that describe a plurality of assisting positioning signals and/or a plurality of assisting UEs may be implemented within, for example, the wireless communications system 200.

Figure 3:
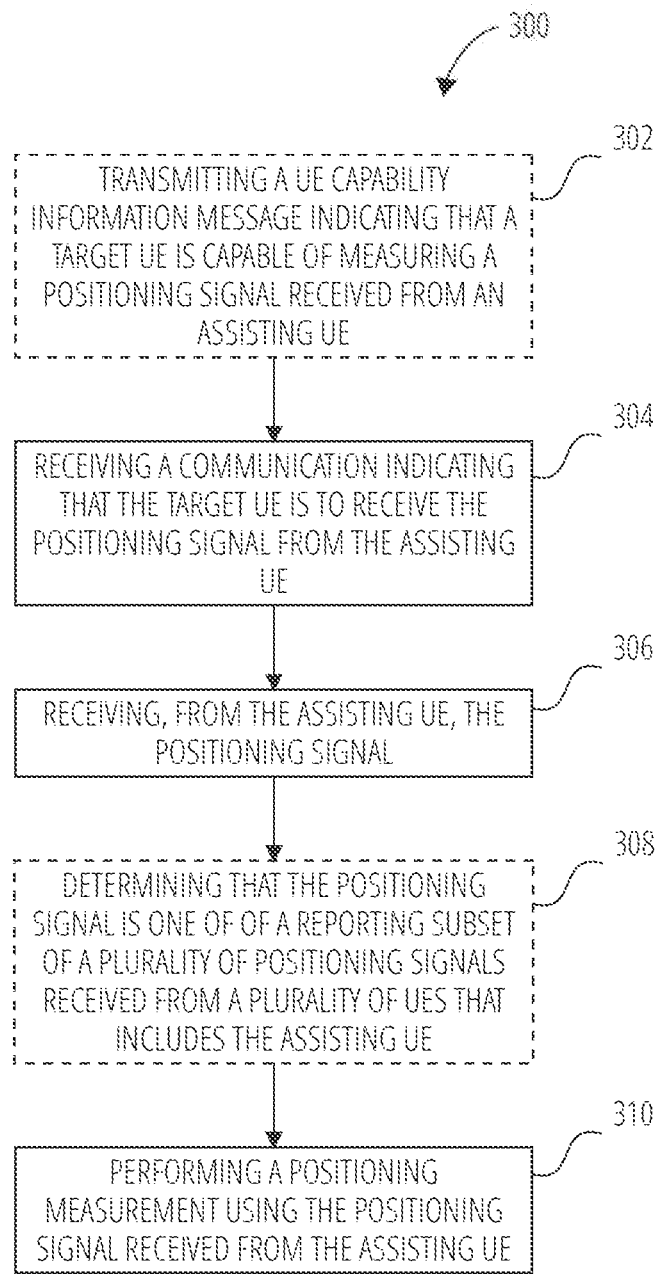
FIG. 3 illustrates a method of a target UE, according to an embodiment.

FIG. 3 illustrates a method 300 of a target UE, according to an embodiment. The method 300 optionally includes transmitting 302 a UE capability information message indicating that the target UE is capable of measuring a positioning signal received from an assisting UE.

The method 300 further includes receiving 304 a communication indicating that the target UE is to receive the positioning signal from the assisting UE.

The method 300 further includes receiving 306, from the assisting UE, the positioning signal.

The method 300 further optionally includes determining 308 that the positioning signal is one of a reporting subset of a plurality of positioning signals received from a plurality of UEs that includes the assisting UE.

The method 300 further includes performing 310 a positioning measurement using the positioning signal received from the assisting UE.

Figure 4:
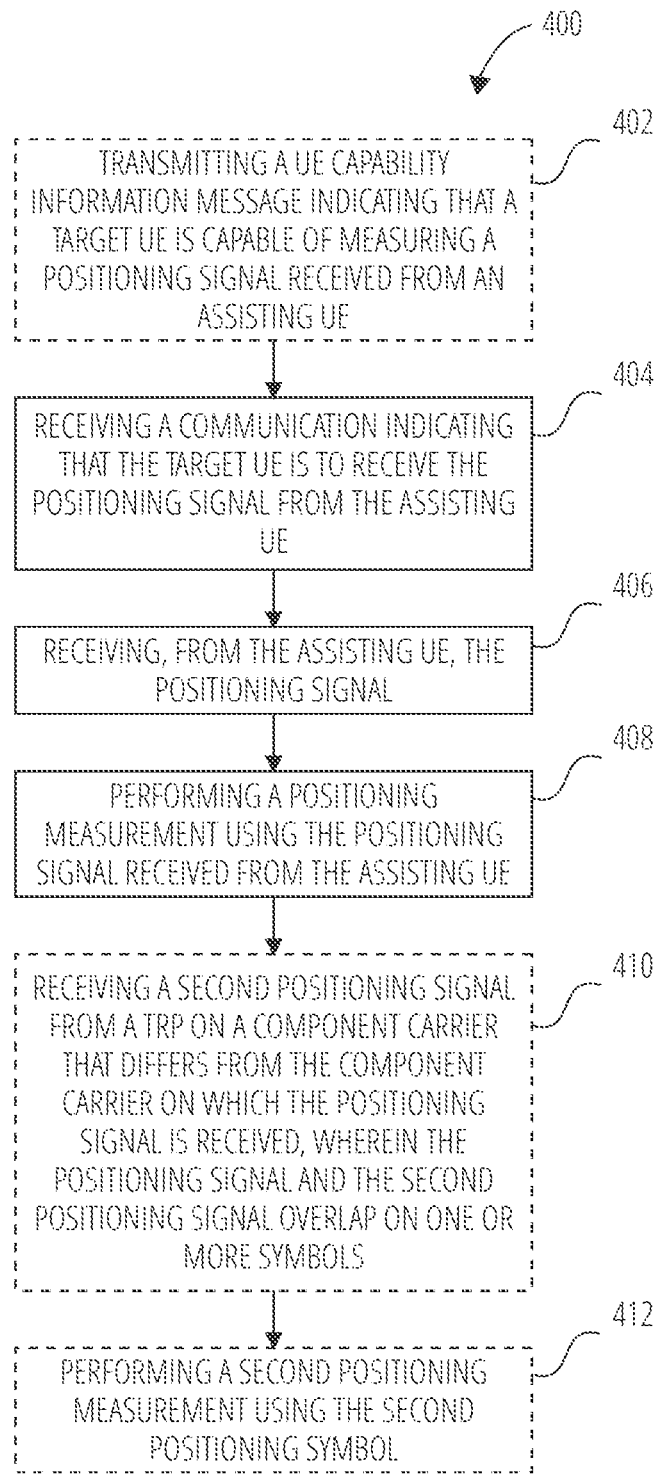
FIG. 4 illustrates a method of a target UE, according to an embodiment.

FIG. 4 illustrates a method 400 of a target UE, according to an embodiment. The method 400 optionally includes transmitting 402 a UE capability information message indicating that the target UE is capable of measuring a positioning signal received from an assisting UE.

The method 400 further includes receiving 404 a communication indicating that the target UE is to receive the positioning signal from the assisting UE.

The method 400 further includes receiving 406, from the assisting UE, the positioning signal.

The method 400 further includes performing 408 a positioning measurement using the positioning signal received from the assisting UE.

The method 400 further optionally includes receiving 410 a second positioning signal from a TRP on a component carrier that differs from the component carrier on which the positioning signal is received, wherein the positioning signal and the second positioning signal overlap on one or more symbols.

The method 400 further optionally includes performing 412 a second positioning measurement using the second positioning symbol.

Figure 5:
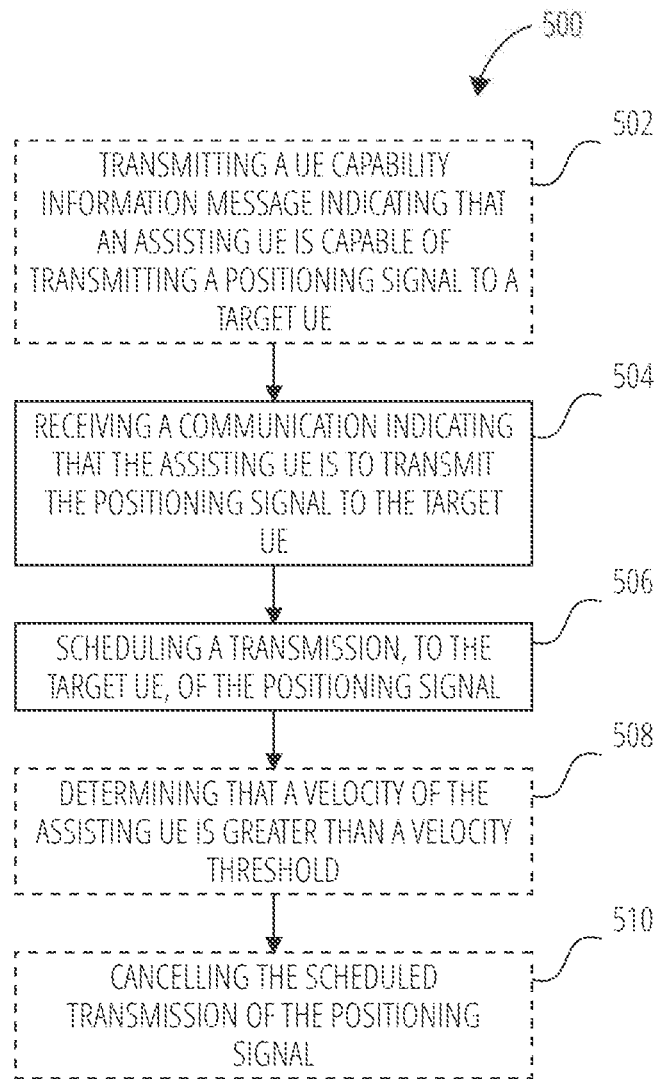
FIG. 5 illustrates a method of an assisting UE, according to an embodiment.

FIG. 5 illustrates a method 500 of an assisting UE, according to an embodiment. The method 500 optionally includes transmitting 502 a UE capability information message indicating that the assisting UE is capable of transmitting a positioning signal to a target UE.

The method 500 further includes receiving 504 a communication indicating that the assisting UE is to transmit the positioning signal to the target UE.

The method 500 further includes scheduling 506 a transmission, to the target UE, of the positioning signal.

The method 500 further optionally includes determining 508 that a velocity of the assisting UE is greater than a velocity threshold.

The method 500 further optionally includes cancelling 510 the scheduled transmission of the positioning signal.

Figure 6:
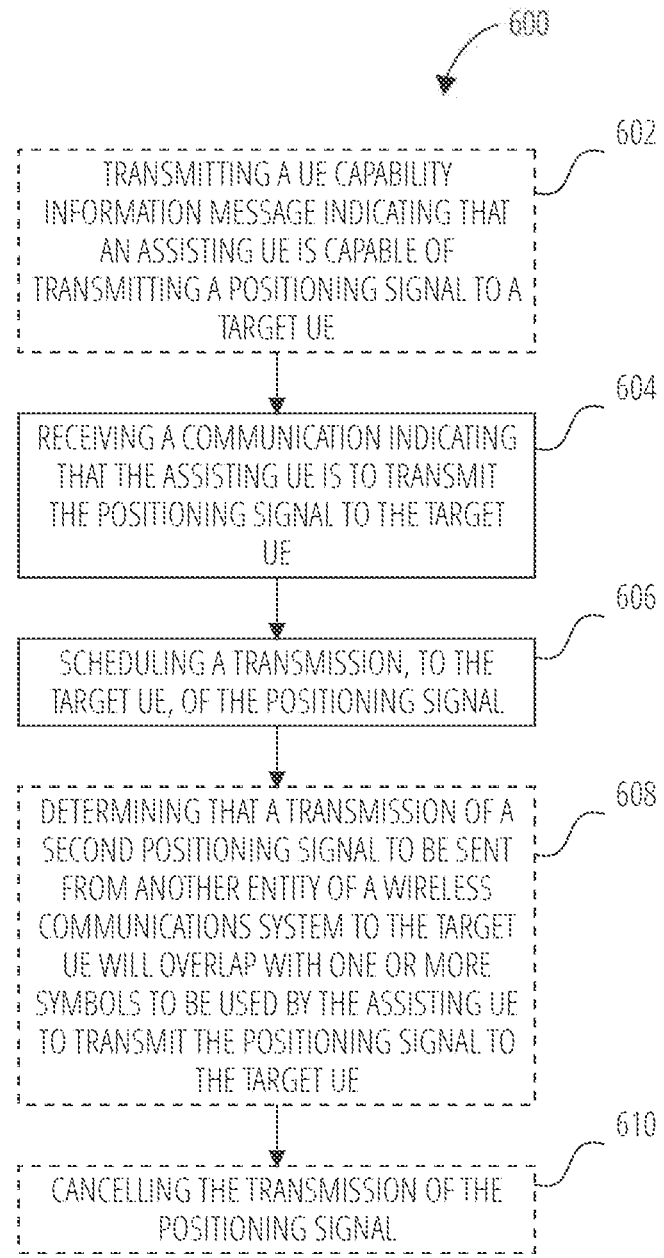
FIG. 6 illustrates a method of an assisting UE, according to an embodiment.

FIG. 6 illustrates a method 600 of an assisting UE, according to an embodiment. The method 600 optionally includes transmitting 602 a UE capability information message indicating that the assisting UE is capable of transmitting a positioning signal to a target UE.

The method 600 further includes receiving 604 a communication indicating that the assisting UE is to transmit the positioning signal to the target UE.

The method 600 further includes scheduling 606 a transmission, to the target UE, of the positioning signal.

The method 600 further optionally includes determining 608 that a transmission of a second positioning signal to be sent from another entity of a wireless communications system to the target UE will overlap with one or more symbols to be used by the assisting UE to transmit the positioning signal to the target UE.

The method 600 further optionally includes cancelling 610 the transmission of the positioning signal.

Figure 7:
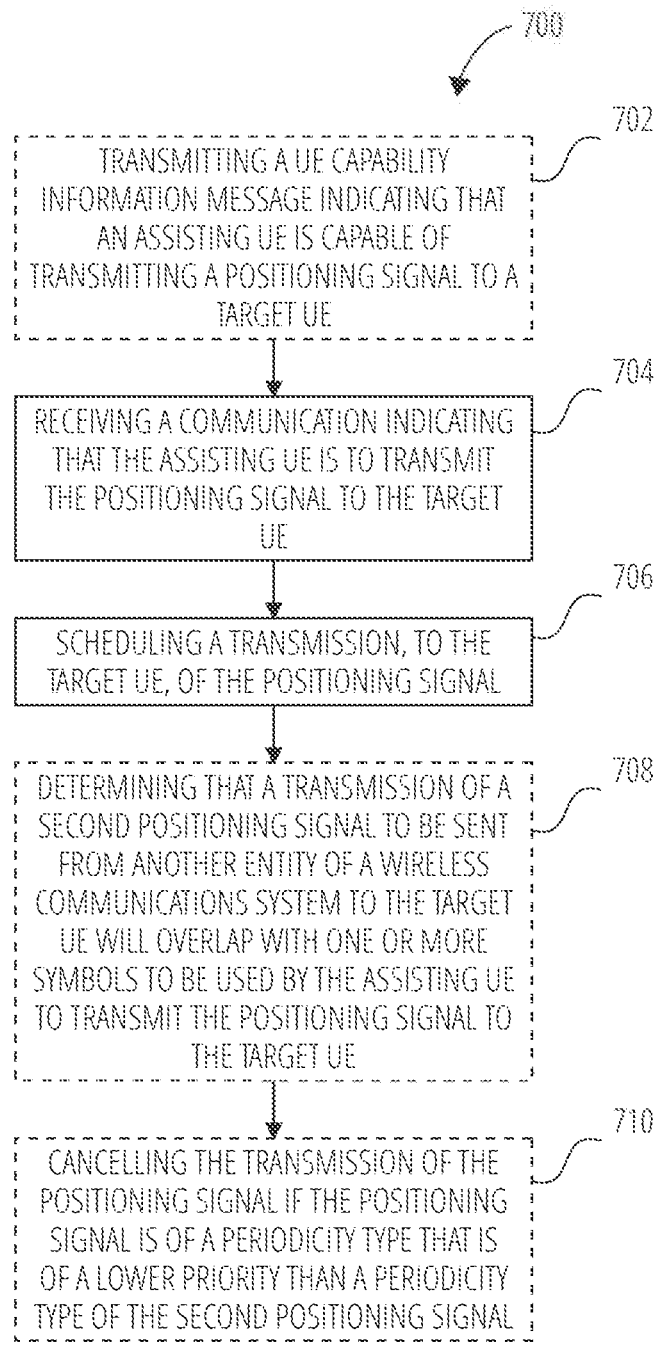
FIG. 7 illustrates a method of an assisting UE, according to an embodiment.

FIG. 7 illustrates a method 700 of an assisting UE, according to an embodiment. The method 700 optionally includes transmitting 702 a UE capability information message indicating that the assisting UE is capable of transmitting a positioning signal to a target UE.

The method 700 further includes receiving 704 a UE capability information message indicating that the assisting UE is capable of transmitting a positioning signal to a target UE.

The method 700 further includes scheduling 706 a transmission, to the target UE, of the positioning signal.

The 700 further optionally includes determining 708 that a transmission of a second positioning signal to be sent from another entity of a wireless communications system to the target UE will overlap with one or more symbols to be used by the assisting UE to transmit the positioning signal to the target UE.

The method 700 further optionally includes cancelling 710 the transmission of the positioning signal if the positioning signal is of a periodicity type that is of a lower priority than a periodicity type of the second positioning signal.

Figure 8:
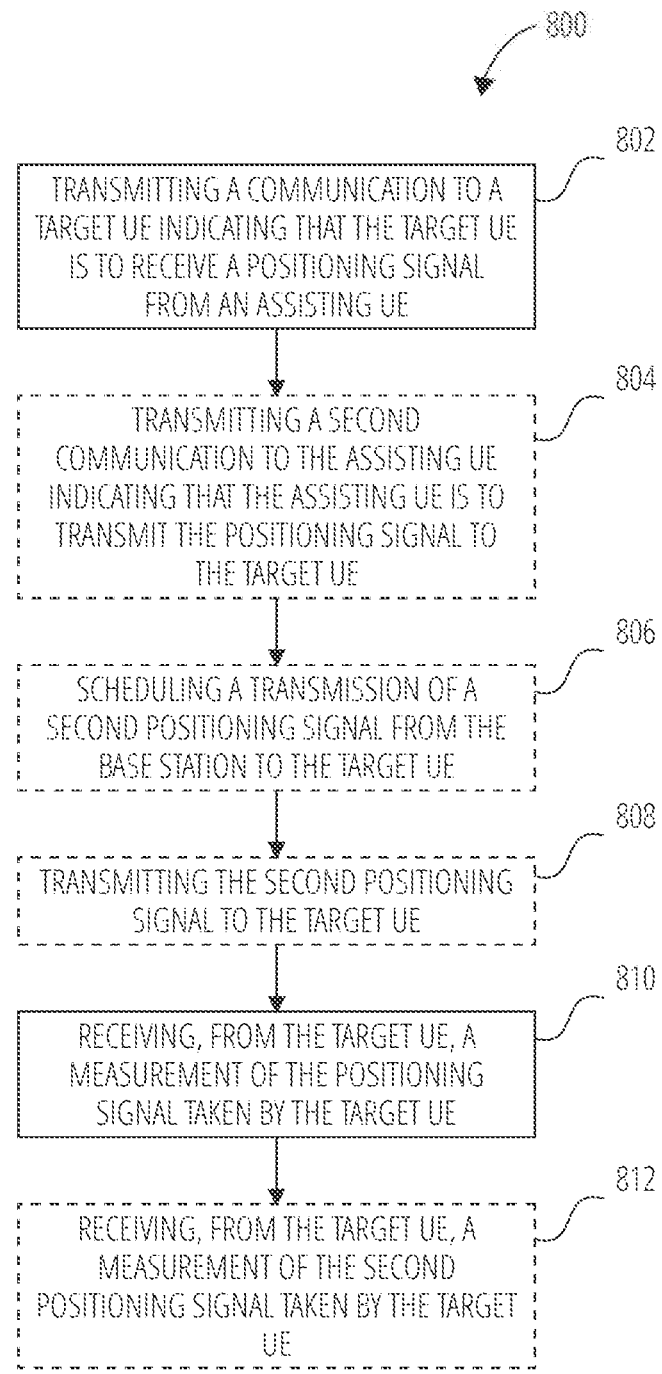
FIG. 8 illustrates a method of a base station, according to an embodiment.

FIG. 8 illustrates a method 800 of a base station, according to an embodiment. The method 800 includes transmitting 802 a communication to a target UE indicating that the target UE is to receive a positioning signal from an assisting UE.

The method 800 further optionally includes transmitting 804 a second communication to the assisting UE indicating that the assisting UE is to transmit the positioning signal to the target UE.

The method 800 further optionally includes scheduling 806 a transmission of a second positioning signal from the base station to the target UE.

The method 800 further optionally includes transmitting 808 the second positioning signal to the target UE.

The method 800 further includes receiving 810, from the target UE, a measurement of the positioning signal taken by the target UE.

The method 800 further optionally includes receiving 812, from the target UE, a measurement of the second positioning signal taken by the target UE.

Figure 9:
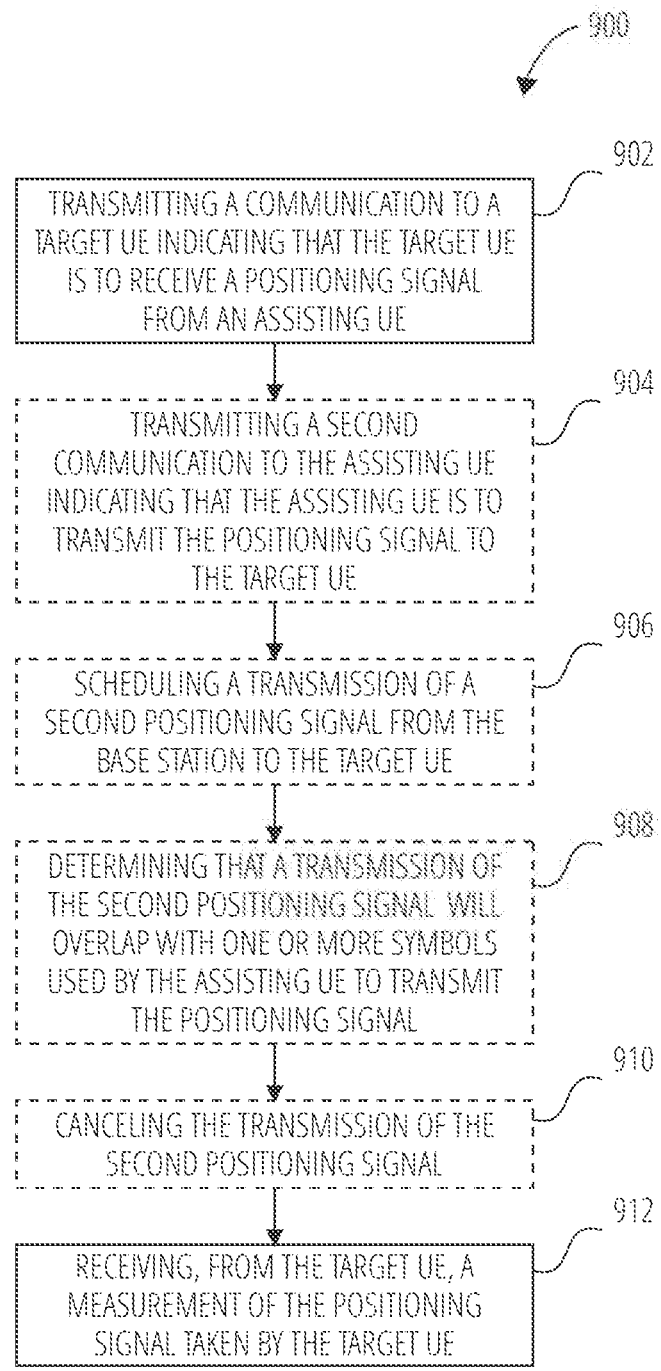
FIG. 9 illustrates a method of a base station, according to an embodiment.

FIG. 9 illustrates a method 900 of a base station, according to an embodiment. The method 900 includes transmitting 902 a communication to a target UE indicating that the target UE is to receive a positioning signal from an assisting UE.

The method 900 further optionally includes transmitting 904 a second communication to the assisting UE indicating that the assisting UE is to transmit the positioning signal to the target UE.

The method 900 further optionally includes scheduling 906 a transmission of a second positioning signal from the base station to the target UE.

The method 900 further optionally includes determining 908 that a transmission of the second positioning signal will overlap with one or more symbols used by the assisting UE to transmit the positioning signal.

The method 900 further optionally includes canceling 910 the transmission of the second positioning signal.

The method 900 further includes receiving 912, from the target UE, a measurement of the positioning signal taken by the target UE.

Figure 10:
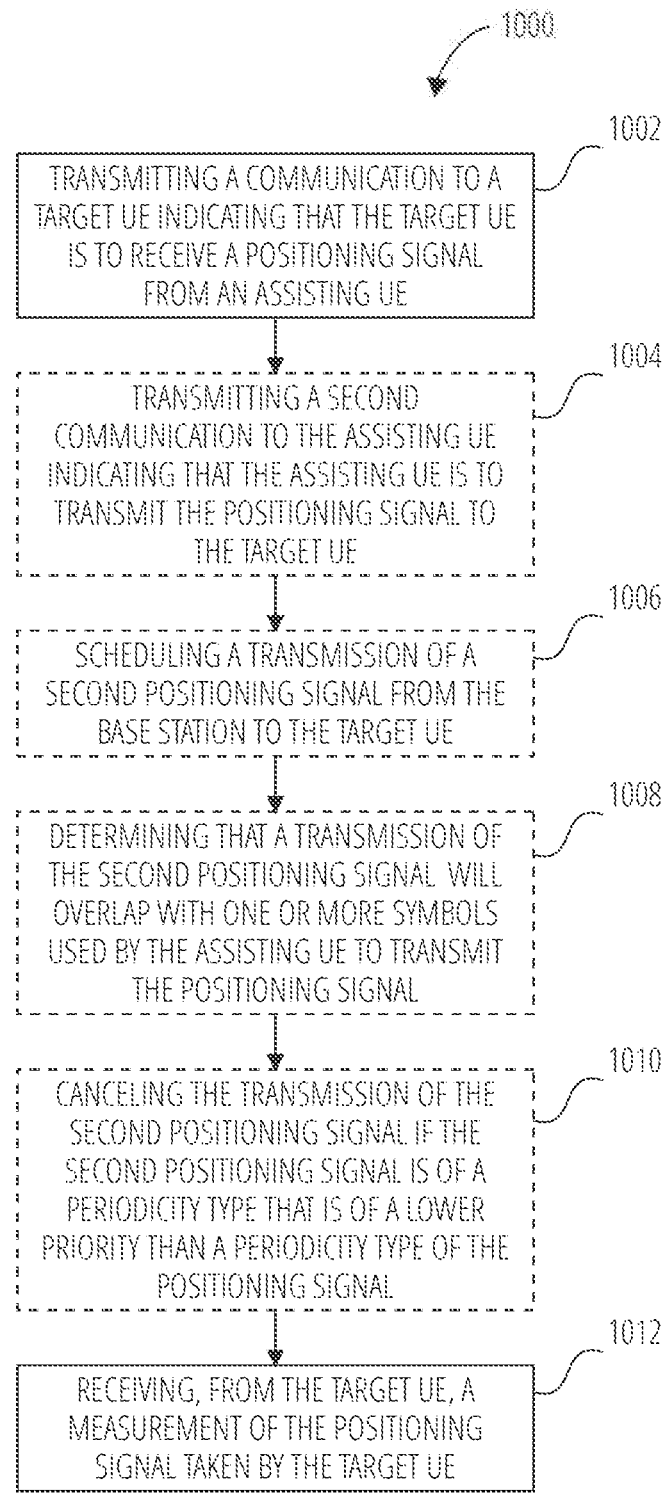
FIG. 10 illustrates a method of a base station, according to an embodiment.

FIG. 10 illustrates a method 1000 of a base station, according to an embodiment. The method 1000 includes transmitting 1002 a communication to a target UE indicating that the target UE is to receive a positioning signal from an assisting UE.

The method 1000 further optionally includes transmitting 1004 a second communication to the assisting UE indicating that the assisting UE is to transmit the positioning signal to the target UE.

The method 1000 further optionally includes scheduling 1006 a transmission of a second positioning signal from the base station to the target UE.

The method 1000 further optionally includes determining 1008 that a transmission of the second positioning signal will overlap with one or more symbols used by the assisting UE to transmit the positioning signal.

The method 1000 further optionally includes canceling 1010 the transmission of the second positioning signal if the second positioning signal is of a periodicity type that is of a lower priority than a periodicity type of the positioning signal.

The method 1000 further includes receiving 1012, from the target UE, a measurement of the positioning signal taken by the target UE.

Figure 11:
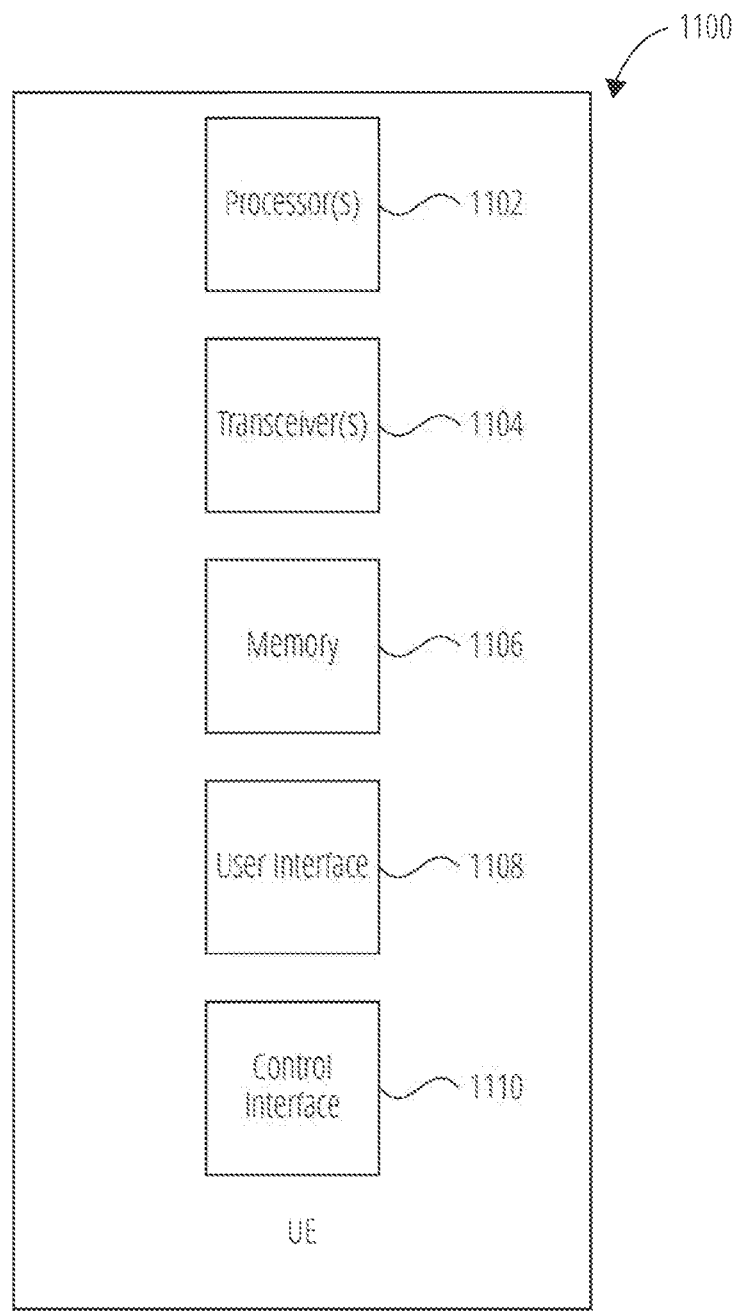
FIG. 11 illustrates a UE, according to an embodiment.

FIG. 11 is a block diagram of an example UE 1100 configurable according to various embodiments of the present disclosure, including by execution of instructions on a computer-readable medium that correspond to any of the example methods and/or procedures described herein. The UE 1100 comprises one or more processor 1102, transceiver 1104, memory 1106, user interface 1108, and control interface 1110.

The one or more processor 1102 may include, for example, an application processor, an audio digital signal processor, a central processing unit, and/or one or more baseband processors. Each of the one or more processor 1102 may include internal memory and/or may include interface(s) to communication with external memory (including the memory 1106). The internal or external memory can store software code, programs, and/or instructions for execution by the one or more processor 1102 to configure and/or facilitate the UE 1100 to perform various operations, including operations described herein. For example, execution of the instructions can configure the UE 1100 to communicate using one or more wired or wireless communication protocols, including one or more wireless communication protocols standardized by 3GPP such as those commonly known as 5G/NR, LTE. LTE-A, UMTS, HSPA, GSM, CPRS, EDGE, etc., or any other current or future protocols that can be utilized in conjunction with the one or more transceiver 1104, user interface 1108, and/or control interface 1110. As another example, the one or more processor 1102 may execute program code stored in the memory 1106 or other memory that corresponds to MAC, RLC, PDCP, and RRC layer protocols standardized by 3GPP (e.g., for NR and/or LTE). As a further example, the processor 1102 may execute program code stored in the memory 1106 or other memory that, together with the one or more transceiver 1104, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 1106 may comprise memory area for the one or more processor 1102 to store variables used in protocols, configuration, control, and other functions of the UE 1100, including operations corresponding to, or comprising, any of the example methods and/or procedures described herein. Moreover, the memory 1106 may comprise non-volatile memory (e.g., flash memory), volatile memory (e.g., static or dynamic RAM), or a combination thereof. Furthermore, the memory 1106 may interface with a memory slot by which removable memory cards in one or more formats (e.g., SD Card, Memory Stick, Compact Flash, etc.) can be inserted and removed.

The one or more transceiver 1104 may include radio-frequency transmitter and/or receiver circuitry that facilitates the UE 1100 to communicate with other equipment supporting like wireless communication standards and/or protocols. For example, the one or more transceiver 1104 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 1102. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 1104 includes a transmitter and a receiver that enable UE 1100 to communicate with various 5G/NR networks according to various protocols and/or methods proposed for standardization by 3 GPP and/or other standards bodies. For example, such functionality can operate cooperatively with the one or more processor 1102 to implement a PHY layer based on OFDM, OFDMA, and/or SC-TDMA technologies, such as described herein with respect to other figures.

The user interface 1108 may take various forms depending on particular embodiments, or can be absent from the UE 1100. In some embodiments, the user interface 1108 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1100 may comprise a tablet computing device including a larger touchscreen display. In such embodiments, one or more of the mechanical features of the user interface 1108 may be replaced by comparable or functionally equivalent virtual user interface features (e.g., virtual keypad, virtual buttons, etc.) implemented using the touchscreen display, as familiar to persons of ordinary skill in the art. In other embodiments, the UE 1100 may be a digital computing device, such as a laptop computer, desktop computer, workstation, etc, that comprises a mechanical keyboard that can be integrated, detached, or detachable depending on the particular exemplary embodiment. Such a digital computing device can also comprise a touch screen display. Many example embodiments of the UE 1100 having a touch screen display are capable of receiving user inputs, such as inputs related to exemplary methods and/or procedures described herein or otherwise known to persons of ordinary skill in the art.

In some exemplary embodiments of the present disclosure, the UE 1100 may include an orientation sensor, which can he used in various ways by features and functions of the UE 1100. For example, the UE 1100 can use outputs of the orientation sensor to determine when a user has changed the physical orientation of the UE 1100's touch screen display. An indication signal from the orientation sensor can be available to any application program executing on the UE 1100, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 1110 may take various forms depending on particular embodiments. For example, the control interface 1110 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 1110 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1100 may include more functionality than is shown in FIG. 11 including, for example, a video and/or still-image camera, microphone, media player and/or recorder, etc. Moreover, the one or more transceiver 1104 may include circuitry for communication using additional radio-frequency communication standards including Bluetooth, GPS, and/or others. Moreover, the one or more processor 1102 may execute software code stored in the memory 1106 to control such additional functionality. For example, directional velocity and/or position estimates output from a GPS receiver can be available to any application program executing on the UE 1100, including various exemplary methods and/or computer-readable media according to various exemplary embodiments of the present disclosure.

Figure 12:
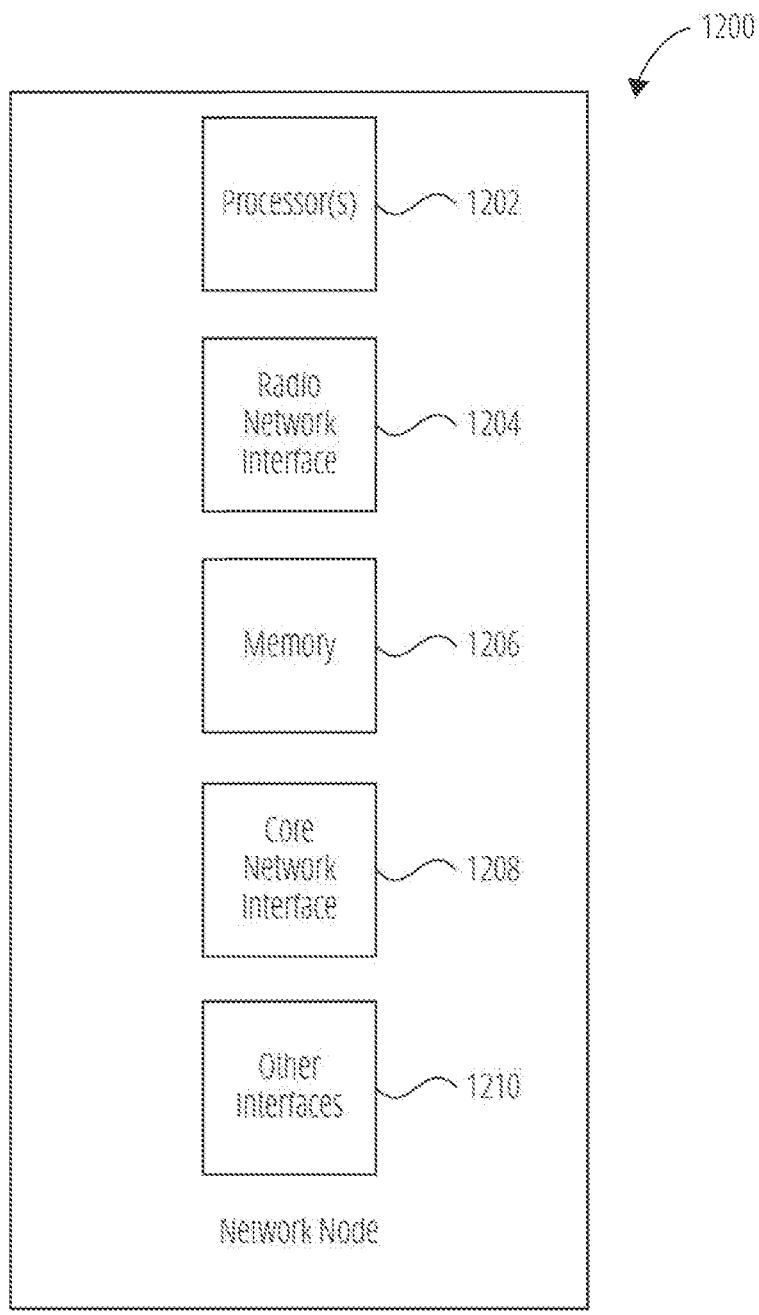
FIG. 12 illustrates a network node node, according to an embodiment.

FIG. 12 is a block diagram of an example network node 1200 configurable according to various embodiments of the present disclosure, including by execution of instructions on a computer-readable medium that correspond to any of the example methods and/or procedures described herein.

The network node 1200 includes a one or more processor 1202, a radio network interface 1204, a memory 1206, a core network interface 1208, and other interfaces 1210. The network node 1200 may comprise, for example, a base station, eNB, gNB, a TRP, an access node, or component thereof.

The one or more processor 1202 may include any type of processor or processing circuitry and may be configured to perform an of the methods or procedures disclosed herein. The memory 1206 may store software code, programs, and/or instructions executed by the one or more processor 1202 to configure the network node 1200 to perform various operations, including operations described herein. For example, execution of such stored instructions can configure the network node 1200 to communicate with one or more other devices using protocols according to various embodiments of the present disclosure, including one or more methods and/or procedures discussed above. Furthermore, execution of such stored instructions can also configure and/or facilitate the network node 1200 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1204 and the core network interface 1208. By way of example and without limitation, the core network interface 1208 comprise an S1 interface and the radio network interface 1204 may comprise a Uu interface, as standardized by 3GPP. The memory 1206 may also store variables used in protocols, configuration, control, and other functions of the network node 1200. As such, the memory 1206 may comprise non-volatile memory (e.g., flash memory, hard disk, etc.), volatile memory (e.g., static or dynamic RAM), network-based (e.g., "cloud") storage, or a combination thereof.

The radio network interface 1204 may include transmitters, receivers, signal processors, ASICs, antennas, beamforming units, and other circuitry that enables network node 1200 to communicate with other equipment such as, in some embodiments, a plurality of compatible user equipment (UE). In some embodiments, the network node 1200 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1204 may include a PHY layer based on OFDM, OFDMA, and/or SC-FDMA technologies. In some embodiments, the functionality of such a PHY layer can be provided cooperatively by the radio network interface 1204 and the one or more processor 1202.

The core network interface 1208 may include transmitters, receivers, and other circuitry that enables the network node 1200 to communicate with other equipment in a core network such as, in some embodiments, circuit-switched (CS) and/or packet-switched Core (PS) networks. In some embodiments, the core network interface 1208 may include the S1 interface standardized by 3GPP. In some embodiments, the core network interface 1208 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1208 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1210 may include transmitters, receivers, and other circuitry that enables the network node 1200 to communicate with external networks, computers, databases, and the like for purposes of operations, administration, and maintenance of the network node 1200 or other network equipment operably connected thereto.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 13:
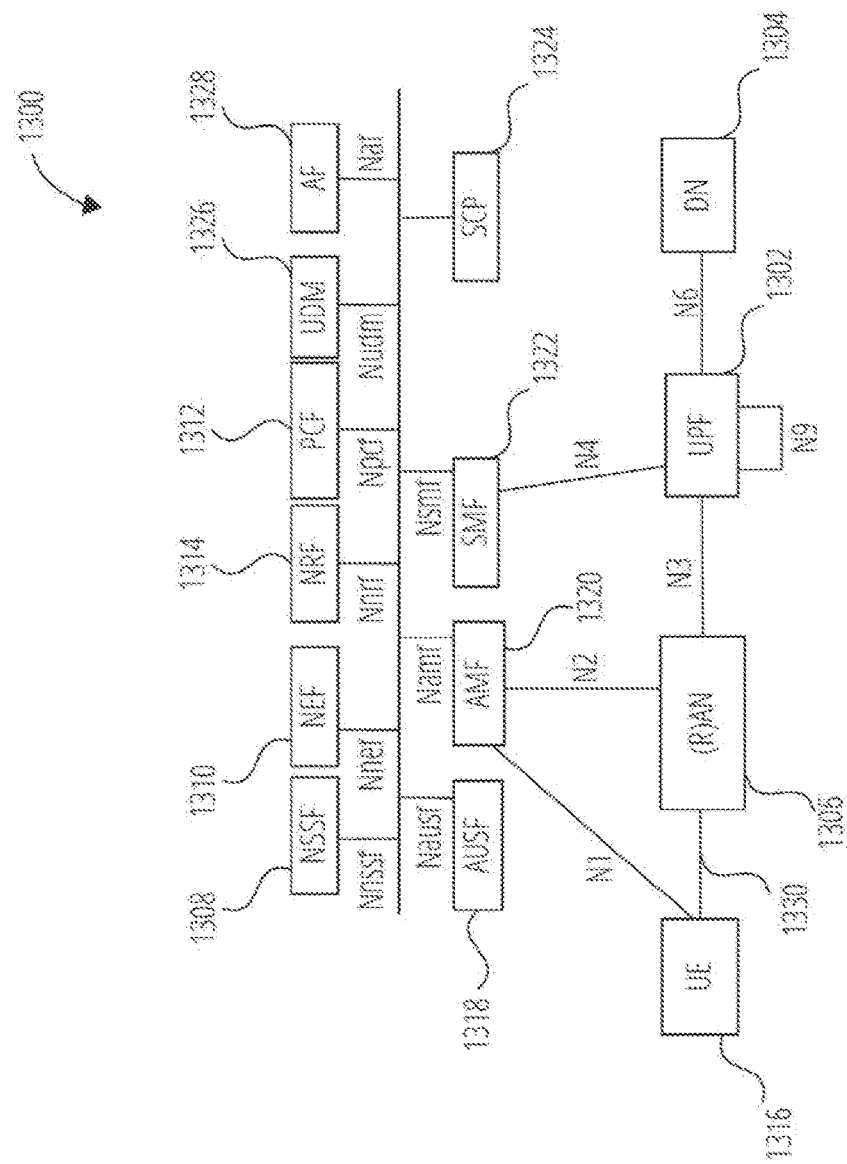
FIG. 13 illustrates an ample service based architecture, according to certain embodiments.

FIG. 13 illustrates a service based architecture 1300 in 5GS according to one embodiment. As described in 3GPP TS 23.501, the service based architecture 1300 comprises NFs such as an NSSF 1308, a NEF 1310, an NRF 1314, a PCF 1312, a UDM 1326, an AUSF 1318, an AMF 1320, an SMF 1322, for communication with a UE 1316, a (R)AN 1306, a UPF 1302, and a DN 1304. The NFs and NY services can communicate directly, referred to as Direct Communication, or indirectly via a SCP 1324, referred to as Indirect Communication. FIG. 13 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 13 are described below.

The NSSF 1308 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 1310 supports exposure of capabilities and events. NF capabilities and events may be securely exposed by the NEF 1310 (e.g., for 3rd party, Application Functions, and/or Edge Computing). The NEF 1310 may store/retrieve information as structured data using a standardized interface (Nudr) to a UDR. The NEF 1310 may also secure provision of information from an external application to 3GPP network and may provide for the Application Functions to securely provide information to the 3GPP network (e.g., expected UE behavior, 5GLAN group information, and service specific information), wherein the NEF 1310 may authenticate and authorize and assist in throttling the Application Functions. The NEF 1310 may provide translation of internal-external information by translating between information exchanged with the AF and information exchanged with the internal network function. For example, the NEF 1310 translates between an AF-Service-Identifier and internal 5G Core information such as DNN and S-NSSAL The NEF 1310 may handle masking of network and user sensitive information to external AF's according to the network policy. The NEF 1310 may receive information from other network functions (based on exposed capabilities of other network functions), and stores the received information as structured data using a standardized interface to a UDR. The stored information can be accessed and re-exposed by the NEF 1310 to other network functions and Application Functions, and used for other purposes such as analytics. For external exposure of services related to specific UE(s), the NEF 1310 may reside in the HPLMN. Depending on operator agreements, the NEF 1310 in the HPLMN may have interface(s) with NF(s) in the VPLMIN. When a UE is capable of switching between EPC and SGC, an SCEF+NEF may be used for service exposure.

The NRF 1314 supports service discovery function by receiving an NF Discovery Request from an NF instance or SCP and providing the information of the discovered NF instances to the NF instance or SCP. The NRF 1314 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 1312 supports a unified policy framework to govern network behavior. The PCF 1312 provides policy rules to Control Plane function(s) to enforce them. The PCF 1312 accesses subscription information relevant for policy decisions in a Unified Data Repository (UDR). The PCF 1312 may access the UDR located in the same PLMN as the PCF.

The UDM 1326 supports generation of 3GPP AKA Authentication Credentials, User Identification Handling (e.g., storage and management of SUPI for each subscriber in the 5G system), de-concealment of a privacy protected subscription identifier (SUCI), access authorization based on subscription data (e.g., roaming restrictions), UE's Serving NF Registration Management (e.g., storing serving AMF for UE, storing serving SMF for UE's PDU Session), service/ session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 1326 uses subscription data (including authentication data) that may be stored in a UDR, in which case a UDM implements the application logic and may not require an internal user data storage and several different UDMs may serve the same user in different transactions. The UDM 1326 may be located in the HPLMN of the subscribers it serves, and may access the information of the UDR located in the same PLMN.

The AF 1328 interacts with the Core Network to provide services that, for example, support the following: application influence on traffic routing; accessing the NEF 1310; interacting with the Policy framework for policy control; and/or IMS interactions with SGC. Based on operator deployment, Application Functions considered to be trusted by the operator can be allowed to interact directly with relevant Network Functions. Application Functions not allowed by the operator to access directly the Network Functions may use the external exposure framework via the NEF 1310 to interact with relevant Network Functions.

The AUSF 1318 supports authentication for 3GPP access and untrusted non-3GPP access. The AUSF 1318 may also provide support for Network Slice-Specific Authentication and Authorization.

The AMF 1320 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 1320. Regardless of the number of Network functions, in certain embodiments there is only one NAS interface instance per access network between the UE and the CN, terminated at one of the Network functions that implements at least NAS security and Mobility Management. The AMF 1320 may also include policy related functionalities.

In addition to the functionalities described above, the AMF 1320 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3INVF/ TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 1322 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCE discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 1322 may include policy related functionalities.

The SCP 1324 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 1324 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 1316 may include a device with radio communication capabilities. For example, the UE 1316 may comprise a smartphone (e.g., handheld touchscreen mobile computing devices connectable to one or more cellular networks). The UE 1316 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 1316 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 1316 may be configured to connect or communicatively couple with the (R)AN 1306 through a radio interface 1330, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 1316 and the (R)AN 1306 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 1306 to the UE 1316 and a UL transmission may be from the UE 1316 to the (R)AN 1306. The UE 1316 may further use a sidelink to communicate directly with another UE (not shown) for D2D, P2P, and/or ProSe communication. For example, a ProSe interface may comprise one or more logical channels, including but not limited to a Physical Sidelink Control Channel (PSDCH), a Physical Sidelink Shared Channel (PSSCH), a Physical Sidelink Discovery Channel (PSDCH), and a Physical Sidelink Broadcast Channel (PSBCH).

The (R)AN 1306 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 1306 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 1306) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface mobility support for the UE 1316 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 1302 may act as an anchor point for intra-RAT and inter-RAT mobility, an external PDU session point of interconnect to the DN 1304, and a branching point to support multi-homed PDU session. The UPF 1302 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 1302 may include an uplink classifier to support routing traffic flows to a data network. The DN 1304 may represent various network operator services, Internet access, or third party services. The DN 1304 may include, for example, an application server.

Figure 14:
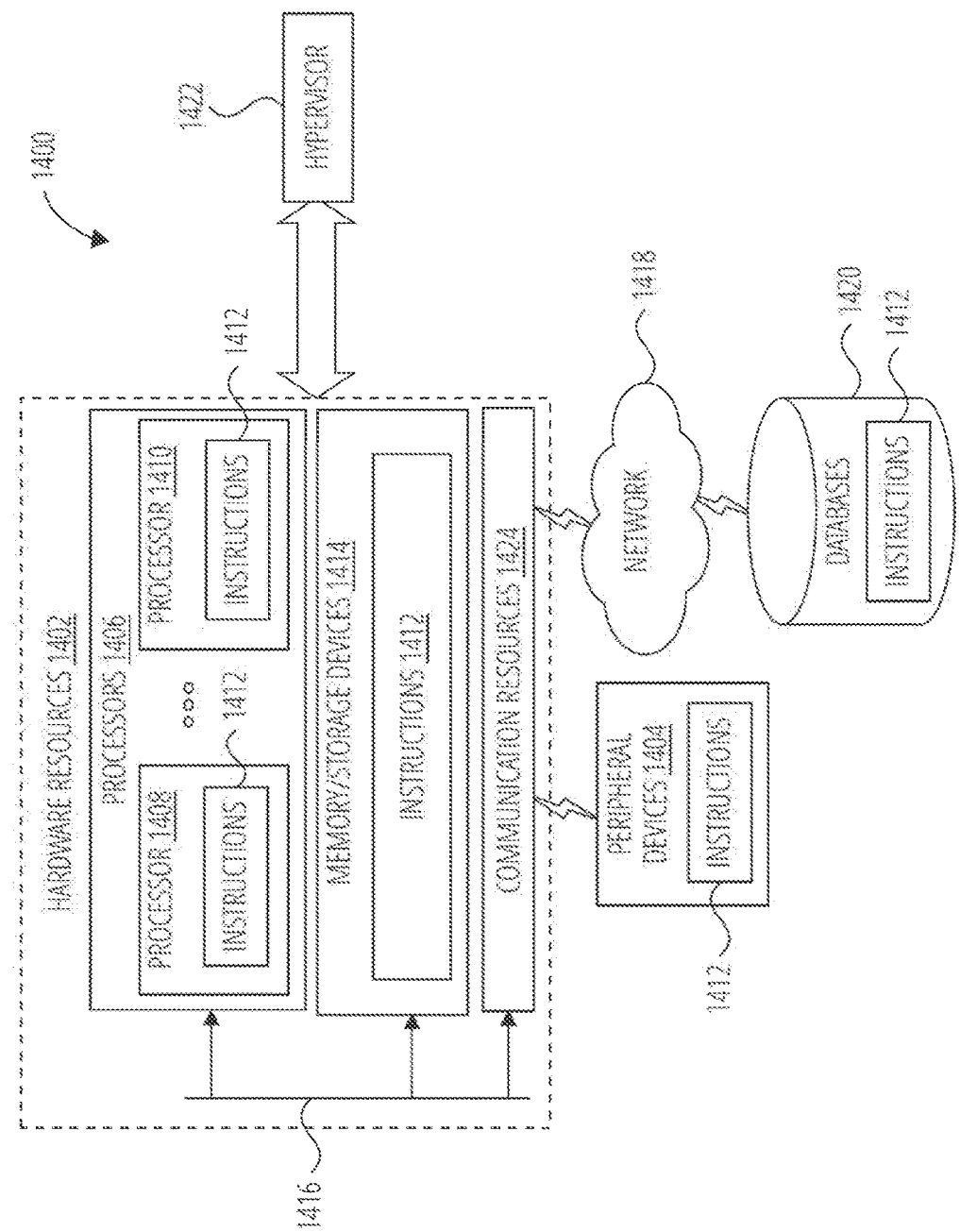
FIG. 14 illustrates components, according to an embodiment.

FIG. 14 is a block diagram illustrating components 1400, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1402 including one or more processors 1406 (or processor cores), one or more memory/storage devices 1414, and one or more communication resources 1424, each of which may be communicatively coupled via a bus 1416. For embodiments where node virtualization (e.g., NFV) is utilized, a hypervisor 1422 may be executed to provide an execution environment for one or more network slices/sub-slices to utilize the hardware resources 1402.

The processors 1406 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RTIC), another processor, or any suitable combination thereof) may include, for example, a processor 1408 and a processor 1410.

The memory/storage devices 1414 may include main memory, disk storage, or any suitable combination thereof. The memory/storage devices 1414 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1424 may include interconnection or network interface components or other suitable devices to communicate with one or more peripheral devices 1404 or one or more databases 1420 via a network 1418. For example, the communication resources 1424 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1412 may comprise software, a program, an application, an applet, an app, or other executable code for causing at least any of the processors 1406 to perform any one or more of the methodologies discussed herein. The instructions 1412 may reside, completely or partially, within at least one of the processors 1406 (e.g., within the processor's cache memory), the memory/storage devices 1414, or any suitable combination thereof. Furthermore, any portion of the instructions 1412 may be transferred to the hardware resources 1402 from any combination of the peripheral devices 1404 or the databases 1420. Accordingly, the memory of the processors 1406, the memory/storage devices 1414, the peripheral devices 1404, and the databases 1420 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a method of a target user equipment (UE) of a wireless communications system, comprising: receiving a communication indicating that the target UE is to receive a positioning signal from an assisting UE; receiving, from the assisting UE, the positioning signal; and performing a positioning measurement using the positioning signal received from the target UE.

Example 2 is the method of Example 1, further comprising transmitting a UE capability information message indicating that the target UE is capable of measuring a positioning signal received from the assisting UE.

Example 3 is the method of any of Examples 1 through 2, wherein the communication is received from the assisting UE in sidelink control information (SCI).

Example 4 is the method of any of Examples 1 through 2, wherein the communication is received in one of downlink control information (DCI) or a medium access control (MAC) control element (MAC-CE) from a base station.

Example 5 is the method of any of Examples 1 through 4, wherein the positioning signal is a downlink (DL) positioning reference signal (DL-PRS).

Example 6 is the method of Example 5, wherein the DL-PRS is a periodic DL-PRS that is configured according to one of a radio resource control (RRC) configuration received at the target UE from the base station and a preconfiguration of the target UE.

Example 7 is the method of Example 5, wherein the DL-PRS is a semi-persistent DL-PRS which is configured according to one of a radio resource control (RRC) configuration received at the target UE from the base station and a preconfiguration of the target UE, wherein the receiving of the semi-persistent DL-PRS is activated by one of downlink control information (DCI) from the base station and sidelink control information (SCI) from the assisting UE.

Example 8 is the method of Example 5, wherein the DL-PRS is an aperiodic DL-PRS which is configured according to one of a radio resource control (RRC) configuration received at the target UE from the base station and a preconfiguration of the target UE, wherein the receiving of the aperiodic DL-PRS is triggered by one of downlink control information (DCI) from the base station and sidelink control information (SCI) from the assisting UE.

Example 9 is the method of any of Examples 1 through 4, wherein the positioning signal is a sounding reference signal (SRS).

Example 10 is the method of Example 9, wherein the SRS is a periodic SRS which is configured according to one of a radio resource control (RRC) configuration received at the target UE from the base station and a preconfiguration of the target UE.

Example 11 is the method of Example 9, wherein the SRS is a semi-persistent SRS which is configured according to one of a radio resource configuration (RRC) configuration received at the target UE from the base station and a preconfiguration of the target UE, wherein the receiving of the periodic SRS is activated by one of downlink control information (DCI) from the base station and sidelink control information (SCI) from the assisting UE.

Example 12 is the method of Example 9, wherein the SRS is an aperiodic SRS which is configured according to one of a radio resource control (RRC) configuration received at the target UE from the base station and a preconfiguration of the target UE, wherein the receiving of the periodic SRS is triggered by one of downlink control information (DCI) from the base station and sidelink control information (SCI) from the assisting UE.

Example 13 is the method of any of Examples 1 through 12, wherein the communication further indicates that the target UE is to receive the positioning signal from the assisting UE on one or more symbols specified for use in a direction that is one of an uplink (UL) direction, a downlink (DL) direction, or a flexible direction.

Example 14 is the method of Example 13, wherein the positioning signal is of a type that corresponds to the direction for which the one or more symbols is specified.

Example 15 is the method of any of Examples 1 through 14, further comprising: receiving a second positioning signal from an entity of the wireless communications system other than the assisting UE on a component carrier that differs from the component carrier on which the positioning signal is received, wherein the positioning signal and the second positioning signal overlap on one or more symbols; and performing a second positioning measurement using the second positioning signal.

Example 16 is the method of any of Examples 1 through 15, further comprising determining that the positioning signal is one of a reporting subset of a plurality of positioning signals received from a plurality of UEs that includes the assisting UE.

Example 17 is the method of Example 16, wherein the positioning signal is determined to be one of the reporting subset based on a reference signal received power (RSRP) of the positioning signal.

Example 18 is the method of Example 16, wherein the positioning signal is determined to be one of the reporting subset based on source prioritization information.

Example 19 is a method of an assisting user equipment (UE) of a wireless communications system, comprising: receiving a communication indicating that the assisting UE is to transmit a positioning signal to a target UE; scheduling a transmission, to the target UE, of the positioning signal.

Example 20 is the method of Example 19, further comprising transmitting a UE capability information message indicating that the assisting UE is capable of transmitting a positioning signal to the target UE.

Example 21 is the method of any of Examples 19 through 20, wherein the communication is received from the target UE in sidelink control information (SCI).

Example 22 is the method of any of Examples 19 through 20, wherein the communication is received in one of downlink control information (DCI) or a medium access control (MAC) control element (MAC-CE) from a base station.

Example 23 is the method of any of Examples 19 through 22, wherein the communication further indicates that the assisting UE is to transmit the positioning signal to the target UE on one or more symbols specified for use in a direction that is one of an uplink (UL) direction, a downlink (DL) direction, or a flexible direction.

Example 24 is the method of Example 23, wherein the positioning signal is of a type that corresponds to the direction for which the one or more symbols is specified.

Example 25 is the method of any of Examples 19 through 24, wherein the communication further indicates that the assisting UE is to transmit the positioning signal at a specific transmit power.

Example 26 is the method of any of Examples 19 through 25, further comprising: determining that a velocity of the assisting UE is greater than a velocity threshold; and canceling the scheduled transmission of the positioning signal.

Example 27 is the method of nay of Examples 19 through 25, further comprising: determining that a transmission of a second positioning signal to be sent from another entity of the wireless communications system to the target UE will overlap with one or more symbols to be used by the assisting UE to transmit the positioning signal to the target UE; and canceling the transmission of the positioning signal.

Example 28 is the method of any of Examples 19 through 25, further comprising: determining that an upcoming transmission of a second positioning signal to be sent from another entity of the wireless communications system to the target UE will overlap with one or more symbols to be used by the assisting UE to transmit the positioning signal to the target UE; and canceling the transmission of the positioning signal if the positioning signal is of a periodicity type that is of a lower priority than a periodicity type of the second positioning signal.

Example 29 is a method of a base station of a wireless communications system, comprising: transmitting a communication to a target user equipment (UE) that the target UE is to receive a positioning signal from an assisting UE; and receiving, from the target UE, a measurement of the positioning signal taken by the target UE.

Example 30 is the method of Example 29, further comprising transmitting a second communication to the assisting UE that the assisting UE is to transmit the positioning signal to the target UE.

Example 31 is the method of any of Examples 29 through 30, further comprising: scheduling a transmission of a second positioning signal from the base station to the target UE; determining that the transmission of the second positioning signal will overlap with one or more symbols used by the assisting UE to transmit the positioning signal to the target UE; and canceling the transmission of the second positioning signal.

Example 32 is the method of any of Examples 29 through 30, further comprising: scheduling a transmission of a second positioning signal from the base station to the target UE; determining that the transmission of the second positioning signal will overlap with one or more symbols used by the assisting UE to transmit the positioning signal to the target UE; and canceling the transmission of the second positioning signal if the second positioning signal is of a periodicity type that is of a lower priority than a periodicity type of the positioning signal.

Example 33 may include an apparatus comprising means to perform one or more elements of a method described in or related to any of the above Examples, or any other method or process described herein.

Example 34 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 35 may include an apparatus comprising logic, modules, or circuitry to perform one or more elements of a method described in or related to any of the above Examples, or any other method or process described herein.

Example 36 may include a method, technique, or process as described in or related to any of the above Examples, or portions or parts thereof.

Example 37 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 38 may include a signal as described in or related to any of the above Examples, or portions or parts thereof.

Example 39 may include a datagram, packet, frame, segment, protocol data unit (PDU), or message as described in or related to any of the above Examples, or portions or parts thereof, or otherwise described in the present disclosure.

Example 40 may include a signal encoded with data as described in or related to any of the above Examples, or portions or parts thereof, or otherwise described in the present disclosure.

Example 41 may include a signal encoded with a datagram, packet, frame, segment, PDU, or message as described in or related to any of the above Examples, or portions or parts thereof, or otherwise described in the present disclosure.

Example 42 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 43 may include a computer program comprising instructions, wherein execution of the program by a processing element is to cause the processing element to carry out the method, techniques, or process as described in or related to any of the above Examples, or portions thereof.

Example 44 may include a signal in a wireless network as shown and described herein.

Example 45 may include a method of communicating in a wireless network as shown and described herein.

Example 46 may include a system for providing wireless communication as shown and described herein.

Example 47 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a target user equipment (UE) of a wireless communications system, comprising:
receiving a communication indicating that the target UE is to receive a positioning signal from an assisting UE;
receiving, from the assisting UE, the positioning signal, wherein the positioning signal is a semi-persistent downlink (DL) positioning reference signal (DL-PRS) which is configured according to one of a radio resource control (RRC) configuration received at the target UE from a base station and a preconfiguration of the target UE, wherein the receiving of the semi-persistent DL-PRS is activated by one of downlink control information (DCI) from the base station and sidelink control information (SCI) from the assisting UE; and
performing a positioning measurement using the positioning signal received from the assisting UE.

2. The method of claim 1, further comprising transmitting a UE capability information message indicating that the target UE is capable of measuring a positioning signal received from the assisting UE.

3. The method of claim 1, wherein the communication further indicates that the target UE is to receive the positioning signal from the assisting UE on one or more symbols specified for use in a direction that is one of an uplink (UL) direction, a downlink (DL) direction, or a flexible direction.

4. The method of claim 3, wherein the positioning signal is of a type that corresponds to the direction for which the one or more symbols is specified.

5. The method of claim 1, further comprising determining that the positioning signal is one of a reporting subset of a plurality of positioning signals received from a plurality of UEs that includes the assisting UE.

6. The method of claim 5, wherein the positioning signal is determined to be one of the reporting subset based on a reference signal received power (RSRP) of the positioning signal.

7. The method of claim 5, wherein the positioning signal is determined to be one of the reporting subset based on source prioritization information.

8. A method of a target user equipment (UE) of a wireless communications system, comprising:
    receiving a communication indicating that the target UE is to receive a positioning signal from an assisting UE, wherein the positioning signal is one of:
        a periodic sounding reference signal (SRS) which is configured according to one of a first radio resource control (RRC) configuration received at the target UE from a base station and a first preconfiguration of the target UE, and
        a semi-persistent SRS which is configured according to one of a second RRC configuration received at the target UE from the base station and a second preconfiguration of the target UE, wherein the receiving of the periodic SRS is activated by one of downlink control information (DCI) from the base station and sidelink control information (SCI) from the assisting UE;
    receiving, from the assisting UE, the positioning signal; and
    performing a positioning measurement using the positioning signal received from the assisting UE.

9. The method of claim 8, further comprising transmitting a UE capability information message indicating that the target UE is capable of measuring a positioning signal received from the assisting UE.

10. The method of claim 8, wherein the communication further indicates that the target UE is to receive the positioning signal from the assisting UE on one or more symbols specified for use in a direction that is one of an uplink (UL) direction, a downlink (DL) direction, or a flexible direction.

11. The method of claim 10, wherein the positioning signal is of a type that corresponds to the direction for which the one or more symbols is specified.

12. The method of claim 8, further comprising determining that the positioning signal is one of a reporting subset of a plurality of positioning signals received from a plurality of UEs that includes the assisting UE.

13. The method of claim 12, wherein the positioning signal is determined to be one of the reporting subset based on a reference signal received power (RSRP) of the positioning signal.

14. The method of claim 12, wherein the positioning signal is determined to be one of the reporting subset based on source prioritization information.

15. A method of a target user equipment (UE) of a wireless communications system, comprising:
    receiving a communication indicating that the target UE is to receive a positioning signal from an assisting UE;
    receiving, from the assisting UE, the positioning signal;
    performing a positioning measurement using the positioning signal received from the assisting UE;
    receiving a second positioning signal from an entity of the wireless communications system other than the assisting UE on a component carrier that differs from the component carrier on which the positioning signal is received, wherein the positioning signal and the second positioning signal overlap on one or more symbols; and
    performing a second positioning measurement using the second positioning signal.

16. The method of claim 15, further comprising transmitting a UE capability information message indicating that the target UE is capable of measuring a positioning signal received from the assisting UE.

17. The method of claim 15, wherein the communication is received from the assisting UE in sidelink control information (SCI).

18. The method of claim 15, wherein the communication is received in one of downlink control information (DCI) or a medium access control (MAC) control element (MAC-CE) from a base station.

19. The method of claim 15, wherein the communication further indicates that the target UE is to receive the positioning signal from the assisting UE on one or more symbols specified for use in a direction that is one of an uplink (UL) direction, a downlink (DL) direction, or a flexible direction.

20. The method of claim 19, wherein the positioning signal is of a type that corresponds to the direction for which the one or more symbols is specified.

* * * * *